(12) United States Patent
Chaoui et al.

(10) Patent No.: US 8,393,563 B2
(45) Date of Patent: Mar. 12, 2013

(54) HANDHELD TOBACCO GRINDER WITH WINDOWS

(75) Inventors: Rani A. Chaoui, Santee, CA (US); Zhou Li Bo Wang Xin, Chang Ning District (CN)

(73) Assignee: Inhale, Inc., Santee, CA (US)

(*) Notice: Subject to any disclaimer, the term of this patent is extended or adjusted under 35 U.S.C. 154(b) by 159 days.

(21) Appl. No.: 12/980,330

(22) Filed: Dec. 29, 2010

(65) Prior Publication Data
US 2012/0168544 A1 Jul. 5, 2012

(51) Int. Cl.
*A47J 43/25* (2006.01)
*B02C 19/20* (2006.01)
(52) U.S. Cl. ..................... 241/168; 241/273.3
(58) Field of Classification Search .......... 241/168, 241/169.1, 273.3
See application file for complete search history.

(56) References Cited

U.S. PATENT DOCUMENTS

| | | | |
|---|---|---|---|
| 795,746 A * | 7/1905 | Balding | 206/238 |
| 854,384 A | 5/1907 | Ross | |
| 4,304,363 A | 12/1981 | Atkielski | |
| 6,517,018 B2 * | 2/2003 | Manson | 241/169.1 |
| 6,834,817 B2 * | 12/2004 | Manson | 241/169.1 |
| 6,945,486 B2 * | 9/2005 | Teng | 241/169.1 |
| 7,059,553 B2 * | 6/2006 | Mueller | 241/199.12 |
| 7,367,519 B2 * | 5/2008 | de Groote et al. | 241/169.1 |
| 7,422,169 B2 * | 9/2008 | Mueller | 241/168 |
| 7,422,170 B2 | 9/2008 | Bao | |
| 7,886,999 B2 * | 2/2011 | Ruzycky | 241/168 |
| 2003/0006328 A1 * | 1/2003 | Manson | 241/169.1 |
| 2003/0015611 A1 * | 1/2003 | Teng | 241/169.1 |
| 2009/0039188 A1 * | 2/2009 | Robbins | 241/168 |

OTHER PUBLICATIONS

CanCovers.com website advertisement for beverage can covers.

* cited by examiner

*Primary Examiner* — Faye Francis
(74) *Attorney, Agent, or Firm* — Louis F. Teran

(57) ABSTRACT

A grinder used to grind material, such as tobacco leaves and other dried fruit and herbs, having windows or plastic covered openings that provide visual access to the interior of the compartment in which the finely grinded material is collected. These windows or plastic covered openings allow the user to visually determine whether sufficient material has been grinded without the burdensome task of repeatedly opening and closing the compartment. Furthermore, the grinder of the present invention is designed to allow the windows or openings to be covered and sealed by a single clear plastic part that is injection molded directly onto the sidewalls of the grinder.

2 Claims, 7 Drawing Sheets

HANDHELD TOBACCO GRINDER WITH WINDOWS

BACKGROUND OF INVENTION

1. Field of Invention

The present invention is related to an apparatus for grinding tobacco leaves and other smoking material for use in cigars or cigarettes. More particularly, the present invention is related to a handheld tobacco grinder with see-through windows to allow the user to visually determine the amount of grinded tobacco produced without opening the grinder prematurely.

2. Description of Prior Art

Producing a rolled up cigar or cigarette or smoking a pipe requires tobacco that has been grinded into very small pieces from a dried tobacco leaf. The grinded tobacco is rolled into a cigar or cigarette using rolling paper so that the user may smoke it. The grinded tobacco is also suitable to be smoked with a conventional smoking pipe. Before the 1900s, dried tobacco leaves were commonly grinded down by means of the palm of the hand and fingers until the pieces were small enough to be used in a cigar or cigarette. In the early 1900s, innovative devices were developed to grind tobacco and other smoking materials.

For example, U.S. Pat. No. 854,384 issued in 1907 teaches a bag with two opposite faces roughened or serrated into which dried tobacco leaves may be inserted. When pressure is applied to the outer faces of the two opposite faces, the dried tobacco leaves may be ground to a fine condition suitable for smoking.

U.S. Pat. No. 4,304,363 teaches a tobacco grinder with a top and bottom half that come together to form an internal cavity having a grinding shaft. As the top half is rotated relative to the lower half, the grinding shaft is rotated to grind the dried tobacco leaves placed within the housing. After the tobacco is ground, it is passed through the holes of a sieve into a cap where it is held until the user is ready to smoke it.

Today, the most widely used tobacco grinder design is one with three cavities, a top cap, and a bottom cap. The top half of the first cavity is formed by the top cap. A plurality of grinding knives protrudes from the top cap. The bottom half of the first cavity also has a plurality of grinding knives and several large holes that lead into the second cavity. The second cavity has a screen that leads into the third cavity. The bottom half of the third cavity is formed by the bottom cap of the grinder.

A dried tobacco leaf is placed inside the first cavity. The top cap is then rotated relative to the rest of the grinder allowing the grinding knives to cut the tobacco into smaller pieces. The smaller tobacco pieces are then passed through the large holes into the second cavity and then through the screen into the third cavity. The pieces in the second cavity can then be directed back to the first cavity for further grinding. The ground tobacco in the third cavity is collected in the bottom cap which is removed by the user when ready to smoke it.

U.S. Pat. No. 7,422,170 was issued in 2008 and teaches a tobacco grinder that is very similar to the popular tobacco grinder used today and described above except that the grinding knives protrude from two separate grinding plates that are separate and independent parts that are removable from the rest of the grinder. This configuration allows the grinding plates, thus the grinding knives, to be manufactured separately and of different material as the rest of the grinder so as to reduce the cost of manufacturing. Otherwise, the grinder taught in the '170 patent is the same as today's popular grinder described above.

A major disadvantage of today's popular tobacco grinder and the grinder taught in the '170 patent is that the interior of the third cavity is not visible at all to the user without removing the bottom cap. The grinded tobacco that is ready for use is ultimately collected in the third cavity. Without removing the bottom cap, the user is unable to determine the amount of grinded tobacco that has been produced. Users are forced to repeatedly remove the bottom cap to decide whether more grinding of tobacco is required. Often, users become proficient at estimating based on the amount of tobacco leaves placed in the first cavity.

Unless this and other practical problems associated with tobacco grinders are resolved, tobacco smokers will continue to blindly estimate the amount of tobacco that has been grinded.

SUMMARY OF THE INVENTION

Accordingly, the present invention has been made in view of the above-mentioned disadvantages occurring in the prior art. The present invention is a tobacco grinder with windows or plastic covered openings that provide visual access to the interior of the compartment in which the finely grinded tobacco is collected. By having these windows or plastic covered openings, the user is able to visually determine whether sufficient tobacco has been grinded without the burdensome task of repeatedly opening the compartment.

It is therefore a primary object of the present invention to provide windows for visual access to the interior of the compartment in the tobacco grinder in which the finely grinded tobacco is collected.

Another object of the present invention is to ensure that said windows are completely covered by a transparent material, such as a clear plastic.

Another object of the present invention is to ensure that the transparent material covering the windows are attached to the housing of the tobacco grinder in a permanent manner so that it does not fall off and it does not allow the grinded tobacco from falling out.

Yet another object of the present invention is to strategically position the windows to allow sufficient light to the interior of the tobacco grinder so that the user can visually determine the amount of grinded tobacco produced.

A still further object of the present invention is to reduce the manufacturing cost of adding the covered windows to a conventional tobacco grinder.

The above objects and other features and advantages of the present invention, as well as the structure and operation of various embodiments of the present invention, are described in detail below with reference to the accompanying drawings.

DESCRIPTION OF THE DRAWINGS

The accompanying drawings which are incorporated by reference herein and form part of the specification, illustrate various embodiments of the present invention and, together with the description, further serve to explain the principles of the invention and to enable a person skilled in the pertinent art to make and use the invention. In the drawings, like reference numbers indicate identical or functional similar elements. A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Reference will now be made to the drawings in which various elements of the present invention will be given numerical designations and in which the invention will be discussed so as to enable one skilled in the art and make use of the invention.

Figure 1:
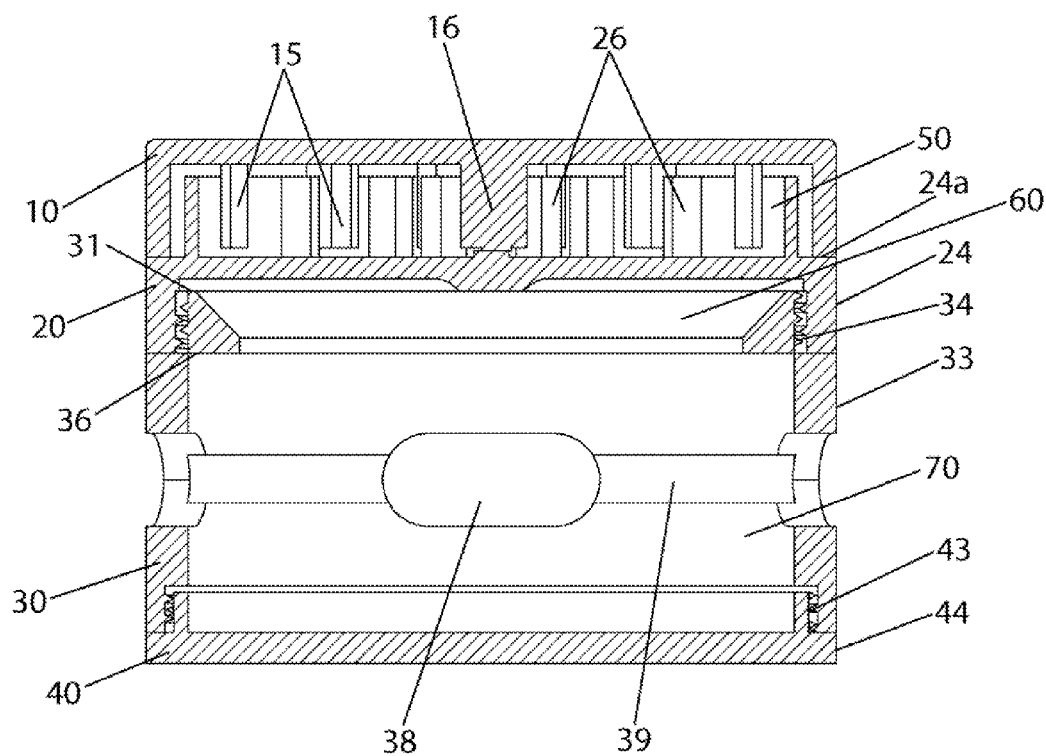
FIG. 1 is a sectional side view of the tobacco grinder according to the preferred embodiment of the present invention.
Figure 2:
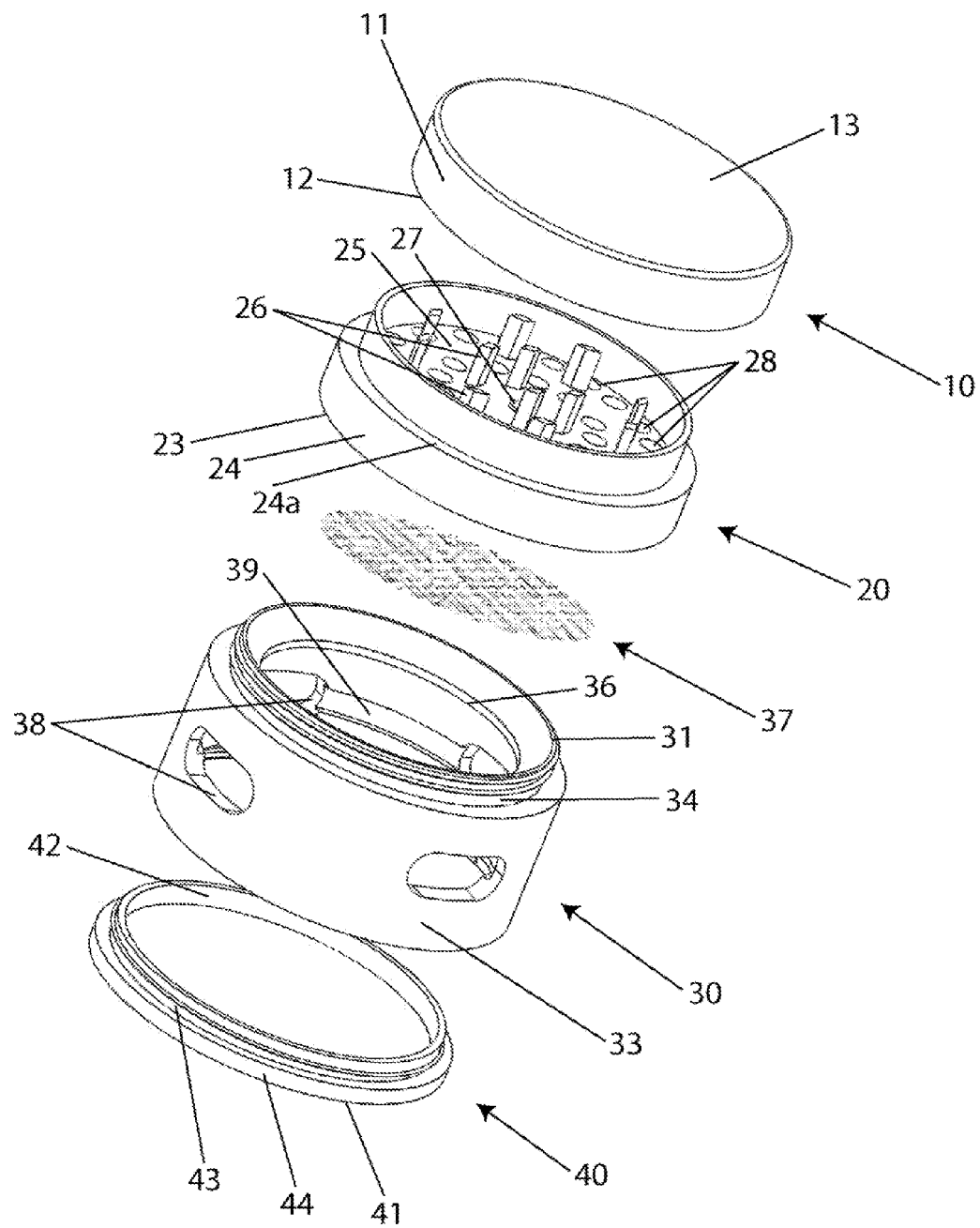
FIG. 2 is an exploded perspective view of the tobacco grinder according to the preferred embodiment of the present invention.
Figure 3:
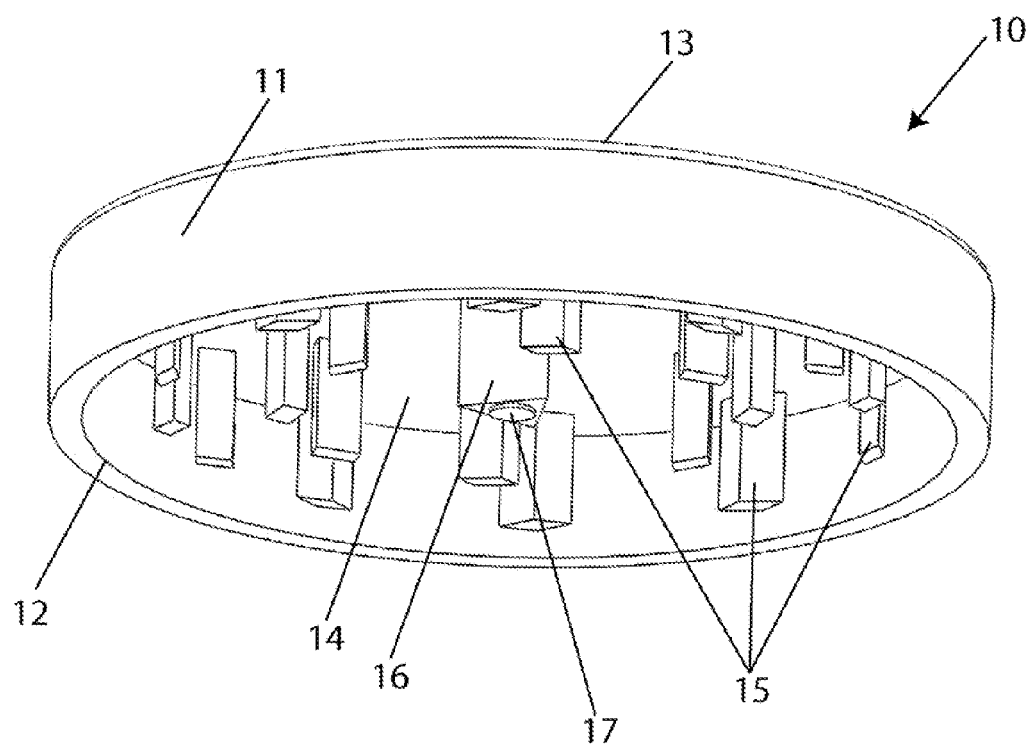
FIG. 3 is a perspective view of the top cap according to the preferred embodiment of the present invention.

As shown in FIG. 1 and FIG. 2, the present invention comprises a tobacco grinder 100 with a top cap 10, a middle section 20, a housing 30, and a bottom cap 40. The top cap 10 is circular in shape with a sidewall 11 that defines its bottom opening 12 and a top cover 13 having a bottom face 14 from which multiple top grinding knives 15 protrude downward, as shown in FIG. 3.

Figure 4:
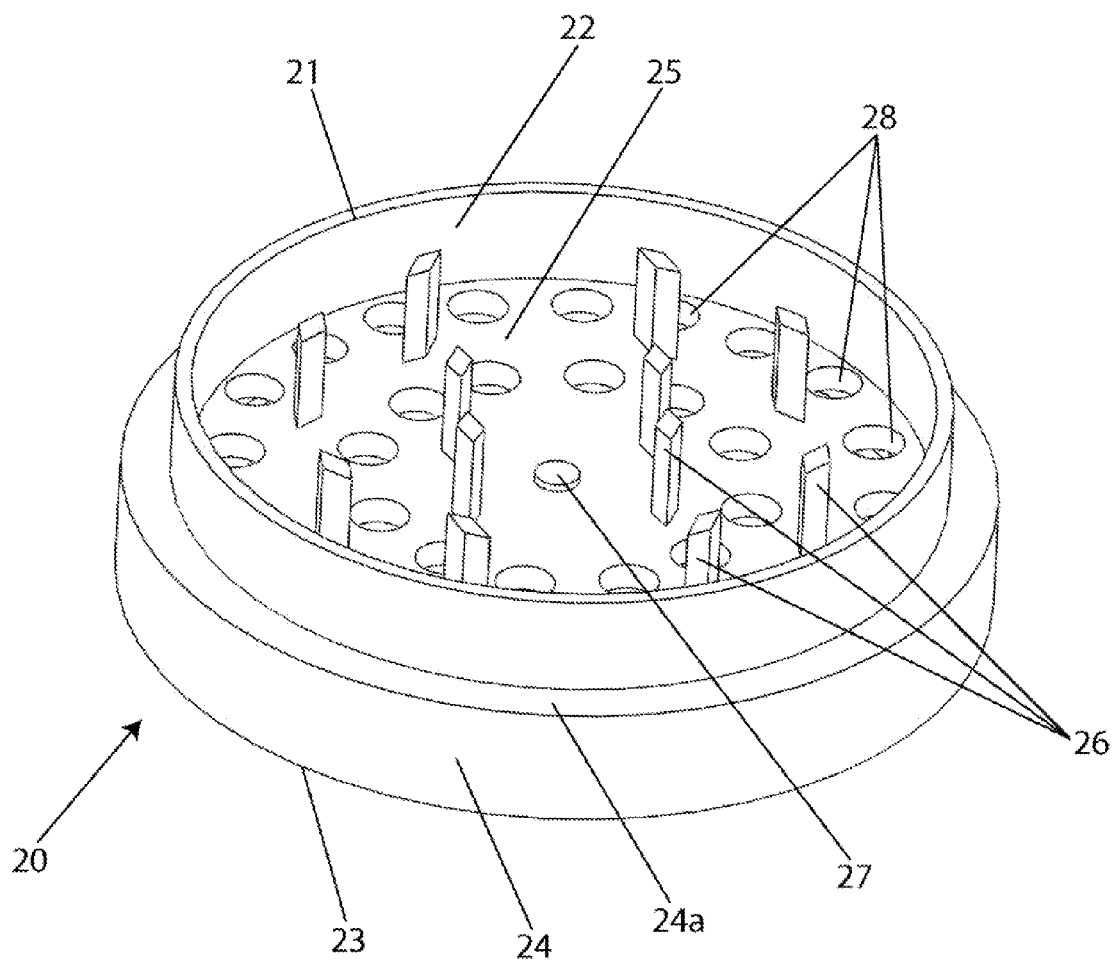
FIG. 4 is a perspective view of the middle section according to the preferred embodiment of the present invention.

As shown in FIG. 4, the middle section 20 is an annular object with a top opening 21 defined by a top sidewall 22 and a bottom opening 23 defined by a bottom sidewall 24. The bottom sidewall 24 has an outer diameter that is equal to the outer diameter of the sidewall 11 of the top cap 10. Whereas, the top sidewall 22 has an outer diameter that is a fraction of an inch less than the inner diameter of the sidewall 11 of the top cap 10. This dimensional configuration allows the top cap 10 to be placed directly over the top sidewall 22 of the middle section 20 and rest on an outer edge 24a created by the bottom sidewall 24 of the middle section 20.

A circular plate 25 is permanently attached to the top sidewall 22. The outer diameter of the circular plate 25 is of sufficient size to allow it to be fit into and within the bottom sidewall 24 of the middle section 20 by force or pressure. Once in place, the circular plate 25 is permanently attached to the bottom sidewall 24 of the middle section 20. When the top cap 10 is placed over the top sidewall 22 of the middle section 20, a grinding compartment 50 is created between the circular plate 25 and the top cover 13 and within the top sidewall 22 of the middle section 20.

The circular plate 25 has multiple holes 26 scattered at various locations to filter the content in the grinding compartment 50 by allowing pieces smaller in size than the multiple holes 26 to fall through and past the circular plate 25. By the same token, pieces that are larger in size than the multiple holes 26 will remain in the grinding compartment 50.

The circular plate 25 also has multiple bottom grinding knives 26 protruding from the top face 25a in an upward direction. Much like the top grinding knives 15 are permanently attached to the top cap 10, the bottom grinding knives 26 are permanently attached to the circular plate 25 in the middle section 20. Furthermore, the location of the bottom grinding knives 26 are arranged so that when the top cap 10 is placed over the top sidewall 22 of the middle section 20, the bottom grinding knives 26 do not interfere with the top grinding knives 15. More importantly, the location of the bottom grinding knives 26 are arranged so that when the top cap 10 is turned with respect to the middle section 20 to rotate it back and forth, the top and bottom grinding knives 15, 26 are correspondingly moved within the grinding compartment 50 to provide a grinding action for grinding the objects within the grinding compartment 50.

Figure 5A:
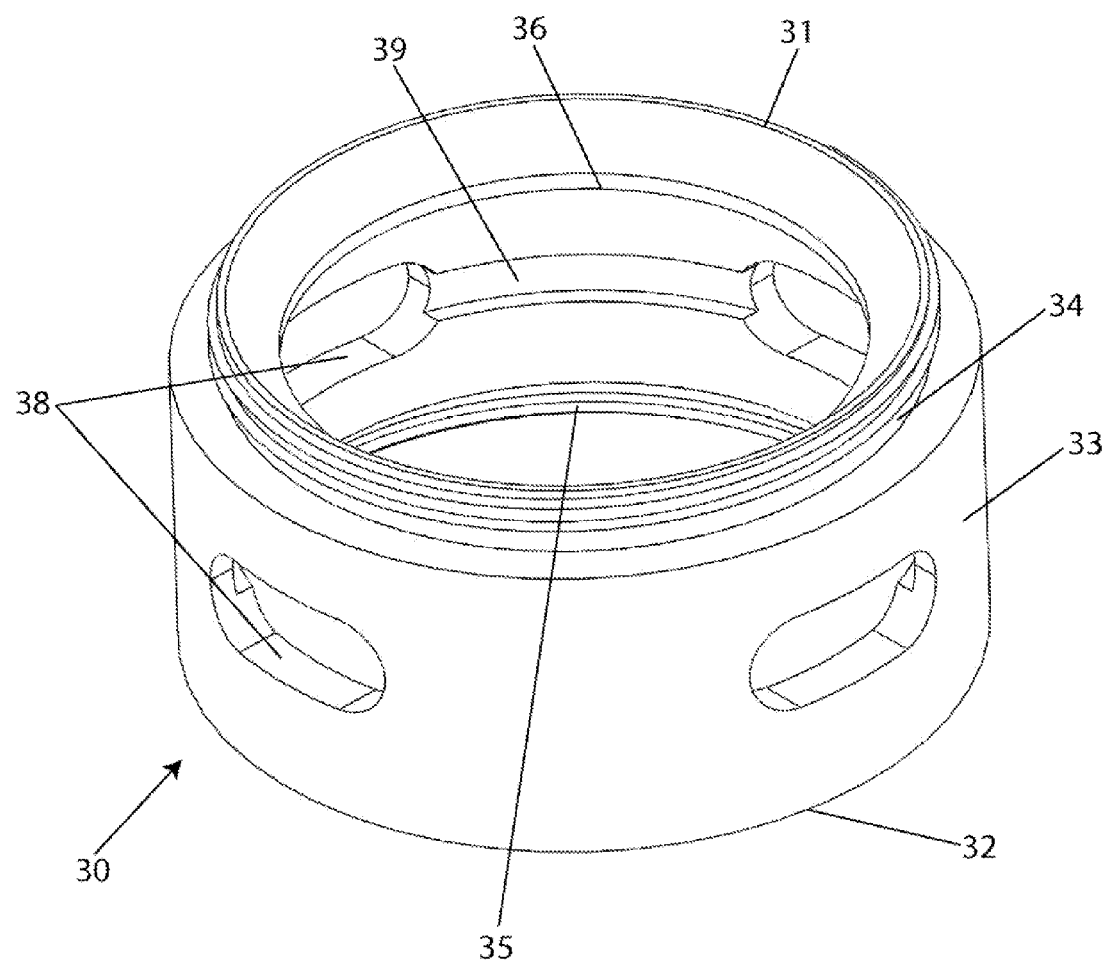
FIG. 5a is a perspective view of the housing according to the preferred embodiment of the present invention.
Figure 5B:
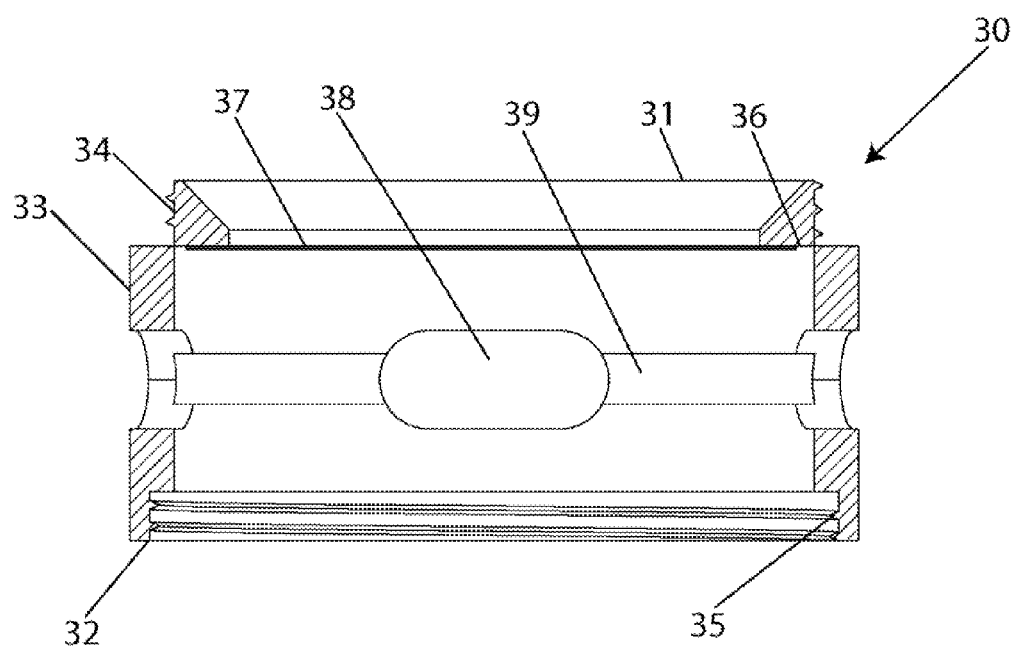
FIG. 5b is a sectional side view of the housing according to the preferred embodiment of the present invention.

As shown in FIG. 5a and FIG. 5b, the housing 30 is a tubular object with a top opening 31, a bottom opening 32, and a housing sidewall 33 with an outer diameter that is the same as the outer diameter of the bottom sidewall 24 of the middle section 20. The housing 30 has external threads 34 at the top and internal threads 35 at the bottom. The housing 30 also has an internal annular edge 36 formed at a given depth along the top of the housing sidewall 33. A screen 37 is then permanently attached to the internal annular edge 36.

At several locations along the housing sidewall 33 various openings 38 are placed horizontally to allow visual access to the interior of the housing 30. The various openings 38 are then covered with a clear plastic, such as polycarbonate. The clear plastic is injection molded directly on to the housing 30 to permanently cover the various openings 38 completely.

A passageway 39 is created on the inside of the housing sidewall 33 and between each opening 38. The passageway 39 allows the clear plastic to flow between the openings 38 so that a single injection of the clear plastic is needed to cover all the openings 38. A single injection of the clear plastic is preferred because it allows all of the openings 38 to be covered by a single unbroken plastic part that cannot be removed from the housing sidewall 33 unless it is broken into multiple pieces. A single injection of the clear plastic is also preferred because it ensures a tight seal that will keep the contents inside the housing 30 from falling or slipping out.

Figure 6:
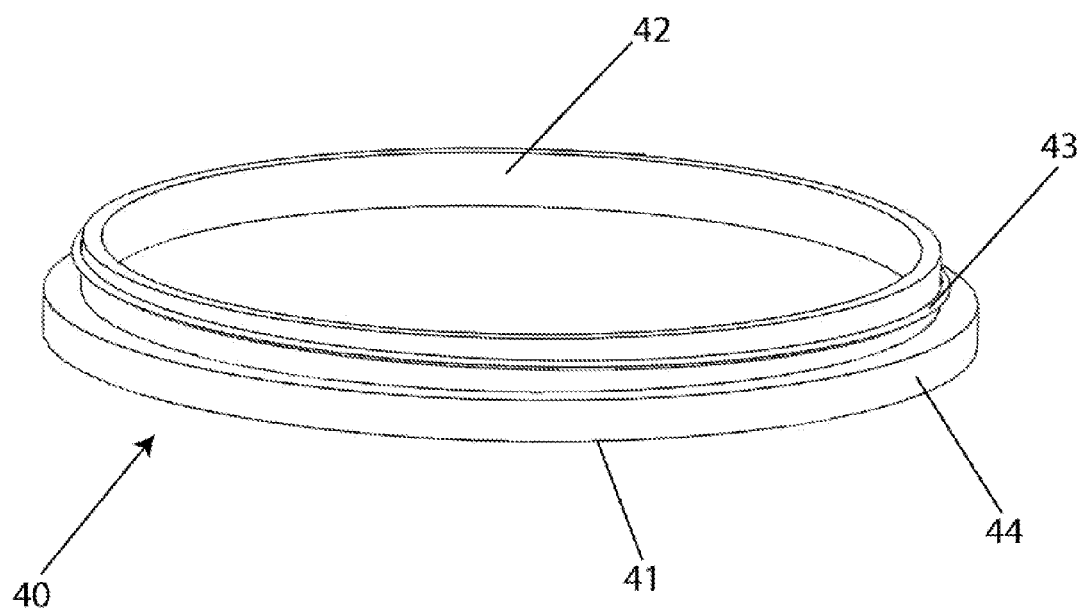
FIG. 6 is a perspective view of the bottom cap according to the preferred embodiment of the present invention.

As shown in FIG. 6, the bottom cap 40 is a circular object with a bottom cover 41 and a short bottom cap sidewall 42 having external threads 43. The outside edge 44 of the bottom cap 40 can be knurled to improve the gripping surface as it is being attached to and detached from the housing 30.

Hereinafter, an explanation on the methods of packing and distributing the product of the present invention and the operating states thereof will be given.

For the distribution of the tobacco grinder 100 of the present invention, four major parts, that is the top cap 10, the middle section 20, the housing 30, and the bottom cap 40, are assembled together and packaged ready for use. Assembly of the four major parts requires the external threads 43 of the bottom cap 40 to be coupled with the internal threads 35 at the bottom of the housing 30 so as to removably attach the bottom cap 40 to the housing 30. Secondly, the external threads 34 at the top of the housing 30 are coupled with internal threads 27 on the bottom sidewall 24 of the middle section 20 so as to removably attach the housing 30 to the middle section 20. Finally, the top cap 10 is placed over the top sidewall 22 of the middle section 20 until it rests on the outer edge 24a.

A top magnet holder 16 protrudes downward from the center of the bottom face 14 of the top cover 13 of the top cap 10. A top magnet 17 is permanently attached at the lowermost end of the top magnet holder 16. A bottom magnet 27 is permanently attached to the center of the top face 25a of the circular plate 25 in the middle section 20. Thus, when the top cap 10 is placed over the top sidewall 22 of the middle section 20, the top magnet 17 and the bottom magnet 27 are aligned to be magnetically attached to each other to hold down the top cap 10 over the middle section 20.

When the four major parts are assembled together, the grinding compartment 50 is formed between the top cover 13 in the top cap 10 and the circular plate 25 in the middle section 20. An intermediate compartment 60 is then formed between the circular plate 25 in the middle section 20 and the screen 37 in the housing 30. Finally, a collection compartment 70 is located between the screen 37 in the housing 30 and the bottom cap 40.

In order to use the product of the present invention, then, after the product is unpackaged, dried tobacco leaves are placed within the grinding compartment 50 on top or within the bottom grinding knives 26. With the tobacco leaves in the grinding compartment 50, the top cap 10 is replaced over the middle section 20. Secondly, the top cap 10 is rotated back and forth around the middle section 20 to provide a grinding action by the top and bottom grinding knives 15, 26 for grinding the tobacco leaves within the grinding compartment 50.

A preferred mode of operation is that the user put the tobacco grinder of the present invention upside down before grinding the tobacco leaves by rotating the top cap 10. After the leaves have been grinded in the grinding compartment, the user restores the position of the tobacco grinder of the present invention to allow the grinded leaves to fall through the multiple holes 26 in the circular plate 25 and into the intermediate compartment 60. From the intermediate compartment 60, the tobacco pieces that have been finely grinded into the desired size will fall through the screen 37 into the collection compartment 70. Thereafter, without removing any caps or opening any compartments, the user has visual access to the interior of the collection compartment 70 through the various openings 38 that are covered with a clear plastic. If the amount of finely grinded tobacco is not sufficient, the user can then turn the tobacco grinder of the present invention upside down again to allow the tobacco in the intermediate compartment 60 to fall through the multiple holes 26 in the circular plate 25 and back into the grinding compartment 50 for more grinding by rotating the top cap 10 back and forth. Alternatively, more tobacco leaves can be added to the grinding compartment 50 prior to turning the tobacco grinder of the present invention upside down again for more grinding. Finally, when the user can visually see through the various openings 38 that sufficient finely grinded tobacco has been produced, the user can remove the bottom cap 40 to access the finely grinded tobacco that is ready for use with a cigar, cigarette, or smoking pipe.

All other tobacco grinders known to the inventor have been designed and manufactured out of metal or plastic without any openings 38, windows, or any other type of visual access to the contents in the collection compartment 70. Thus, the user is required to open the collection compartment to determine if a sufficient amount of tobacco has been grinded. If more is needed, the user has to close the collection compartment and grind some more tobacco. This process of having to continuously open and close the collection compartment is burdensome and can lead to accidental spillage of the grinded tobacco by the user. The tobacco grinder of the present invention eliminates this need to continuously open and close compartments by adding the various openings 38 covered with a clear plastic to provide the user visual access to the interior of the collection compartment 70 while maintaining the tobacco securely inside the compartments.

It is understood that the described embodiment of the present invention is illustrative only, and that modifications thereof may occur to those skilled in the art. Accordingly, this invention is not to be regarded as limited to the embodiment disclosed, but to be limited only as defined by the appended claims herein.

What is claimed is:

1. A grinder comprising:
  a top cap having a bottom opening and a plurality of top grinding knives protruding downward;
  a middle section having a top opening that is removably inserted into said bottom opening of said top cap, a bottom opening, and a plate, wherein said plate comprises a plurality of bottom grinding knives protruding upward and a plurality of holes;
  a housing having an interior, a top opening that is removably attached to said bottom opening of said middle section, a means for filtering grinded material within said middle section, a bottom opening, a sidewall having a plurality of openings that are interconnected to each other by a passageway, and wherein said plurality of openings are completely covered by a clear transparent material that allows visual access to said interior; and
  a bottom cap having a top opening that is removably attached to said bottom opening of said housing.

2. The grinder, as recited in claim 1, wherein said passageway allows plastic to be injected on to said housing to create a single piece that covers and seals said plurality of openings to facilitate the capture and protection of said grinded material within said interior of said housing.

* * * * *